US006601026B2

(12) United States Patent
Appelt et al.

(10) Patent No.: US 6,601,026 B2
(45) Date of Patent: Jul. 29, 2003

(54) INFORMATION RETRIEVAL BY NATURAL LANGUAGE QUERYING

(75) Inventors: Douglas E. Appelt, Palo Alto, CA (US); James Frederick Arnold, Helena, MT (US); John S. Bear, Half Moon Bay, CA (US); Jerry Robert Hobbs, Los Altos, CA (US); David J. Israel, Palo Alto, CA (US); Megumi Kameyama, deceased, late of Cupertino, CA (US), by Helge Szwerinski, executor; David L. Martin, Santa Clara, CA (US); Karen Louise Myers, Palo Alto, CA (US); Gopalan Ravichandran, Mountain View, CA (US); Mark Edward Stickel, Mountain View, CA (US); William Mabry Tyson, Los Altos, CA (US)

(73) Assignee: Discern Communications, Inc., Menlo Park, CA (US)

( * ) Notice: Subject to any disclaimer, the term of this patent is extended or adjusted under 35 U.S.C. 154(b) by 0 days.

(21) Appl. No.: 09/398,233

(22) Filed: Sep. 17, 1999

(65) Prior Publication Data

US 2003/0078766 A1 Apr. 24, 2003

(51) Int. Cl.[7] .......................... G06F 17/27; G06F 17/30
(52) U.S. Cl. ................................. 704/9; 707/3
(58) Field of Search .................. 704/1, 9, 10; 707/3–5, 707/102, 531, 532; 706/15

(56) References Cited

U.S. PATENT DOCUMENTS

| 5,278,980 A | | 1/1994 | Pedersen et al. ............ 395/600 |
|---|---|---|---|
| 5,630,121 A | * | 5/1997 | Branden-Harder et al. . 707/102 |
| 5,895,464 A | * | 4/1999 | Bhandari et al. .............. 707/3 |
| 5,963,205 A | * | 10/1999 | Sotomayor .................. 345/333 |
| 5,983,221 A | * | 11/1999 | Christy .......................... 707/5 |
| 6,094,649 A | * | 7/2000 | Bowen et al. ................. 707/3 |
| 6,173,279 B1 | * | 1/2001 | Levin et al. ................... 707/5 |
| 6,233,547 B1 | * | 5/2001 | Benber .......................... 704/9 |
| 6,295,529 B1 | * | 9/2001 | Corston-Oliver et al. ...... 707/3 |
| 6,470,333 B1 | * | 10/2002 | Baclawski .................... 707/3 |
| 6,487,545 B1 | * | 11/2002 | Wical .......................... 706/45 |

OTHER PUBLICATIONS

"Using Information Extraction to Improve Document Retrieval", John Bear, et al., Proceedings of the Sixth Text Retrieval Conference, Gathiersburg, MD, Nov. 1997, published Jan. 9, 1998.

"FASTUS: A Cascaded Finite–State Transducer For Extracting Information from Natural–Language Text", Jerry R. Hobbs, et al., Finite State Devices for Natural Language Processing, MIT Press, 1996.

"SRI International Fastus System MUC–6 Test Results and Analysis", Douglas E. Appelt, et al., Proceedings of the Sixth Message Understanding Conference, Columbia, MD 1995.

"FASTUS: A Finite–state Processor for Information Extraction" Real–world Text, Douglas E. Appelt, et al., Real–World Text, in Proceedings of IJCAI–93, Chambery, France, Sep. 1993.

Written Opinion from PCT Appln. No. PCT/US00/25346 mailed Aug. 8, 2001.

* cited by examiner

Primary Examiner—Patrick N. Edouard
(74) Attorney, Agent, or Firm—Moser, Patterson & Sheridan, LLP.; Kin-Wah Tong, Esq

(57) ABSTRACT

A natural language information querying system includes an indexing facility configured to automatically generate indices of updated textual sources based on one or more predefined grammars and a database coupled to the indexing facility to store the indices for subsequent searching.

51 Claims, 12 Drawing Sheets

 FastFacts! Demo
Rapid information access for specialized fields of science and business

Ask FastFacts! A question: ⟋ 500
| Tell me about joint ventures involving SBC in the Communications Services Services. |
Do it!
Example:    Did Barnes & Noble buy anyone this year?

If you prefer a menu-driven approach, please use this alternate interface to specify your query.

☞ *Let me show you all of the references generated by your query...*    ⟋ 502
☞ *Let me show you the response from Ask Jeeves<sup>SM</sup> to the same question...*    ⟋ 504

| Joint Ventures involving Telefonos de Mexico S.A. de C.V. and SBC Communications Inc. |

⟋ 506
| New York Times, Fri, 14 May 1999 13:21:59 PDT: ... The announcement also noted that SBC had formed a joint venture with Telefonos de Mexico S.A. de C.V. ('Telmex') to effect the acquisition... |

The material contained in this page is confidential and proprietary to SRI International and may not be reproduced. published, or disclosed to others without authorization from SRI International.
Ask Jeeves is a trademark of Ask Jeeves. Inc.. Copyright 1996-1999 Ask Jeeves. Inc.
(C)    SRI International 1999

FIG. 7

FastFacts! Demo
Rapid information access for specialized fields of science and business

---

Copyright 1999 by PR Newswire (via ClariNet), Fri, 14 May 1999 13:21:59 PDT

Cellular Communications of Puerto Rico, Inc.
Organization:Copyright 1999 by PR Newswire (via ClariNet)
Message-ID:
Lines:127  ⟵ 506
Date:Fri, 14 May 1999 13:21:59 POT
Location:Puerto Rico
ACategory:financial
Slugword:CLRP-first-qtr-result
Threadword:     clrp
Priority:regular
Approved:e . news@clari. net
Xref:news..sri.com clari.biz.earnings.releases:96509 clari.tw.telecom.releases:61084

NEW YORK, May 14 /PRNewswire/ -- Cellular Communications of Puerto Rico, Inc. (Nasdaq: CLRP) (the "Company") announced today operating results for the three months ended March 31, 1999.

Record EBITDA at CCPR
At CCPR, Inc. ("CCPR"), the Company's wholly-owned subsidiary operating in Puerto Rico and the U.S. Virgin Islands, EBITDA (Earnings before Interest, Taxes, Depreciation and Amortization) increased to a record $21.1 million for the first quarter of 1999 versus $14.6 million for the first quarter of 1998.
KBITDA as a percentage of service revenues was 51.7% in the first quarter of 1999 versus 42.3% in the first quarter of 1998.
Cellular subscribers increased by 120,700 to 332,600 as of March 31, 1999, a 57% increase over the 211,900 subscribers reported as of March 31, 1998.
CLRP's KBITDA after corporate overhead was $20.7 million for the first quarter of 1999 versus $14.1 million for the first quarter of 1998.

CLRP to be Acquired
On May 3, 1999, the Company announced that it had entered into an ⟵ 508
agreement with SBC Communications Inc. ("SBC") under which it would be acquired in a transaction valued at $29.50 per outstanding share. The annoucement also noted that SBC had formed a joint venture with Telefonos de Mexico S.A. de C.V. ("Telmex") to effect the acquisition.
SBC and Telmex through the joint venture will pay shareholders $29.50 per share and assume the outstanding debt of the Company. The companies aim to complete the merger by late third quarter, pending a vote by the Company's shareholders and regulatory approvals.

| Financial Highlights | | Three Months Ended March 31 |
|---|---|---|
| | | 1999        1998 |
| | | In thousands, except for subscriber data |
| CCPR Revenues: | FIG. 8 | |

INFORMATION RETRIEVAL BY NATURAL LANGUAGE QUERYING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The invention relates to information retrieval by natural language querying.

The World-Wide-Web (Web) is a relatively new publishing medium where a vast number of documents can be retrieved and viewed by anyone with access to the Internet. By endowing individuals, companies and organizations with the ability to publish and retrieve information conveniently and inexpensively, the Web has become the gateway to a plethora of information. Its success as an information distribution and retrieval system has resulted in a vast sea of information on the Web.

This information explosion has undermined the Web's utility as an information source. To assist overwhelmed users in locating and retrieving specific useful information from the Web, a variety of search engines have been developed. Typically, a search engine accepts one or more keywords from a user, performs a search for documents containing the keywords and returns links to documents containing the keywords for the user to review. Although traditional search engines are capable of supporting highly specific search queries using one or more command sequences, users typically default to entering two or three keywords into the search engine as queries because they are not comfortable with the intricate format associated with the command sequences.

Typically search engines use Boolean search techniques, which rely on the presence of each keyword. The Boolean search approach is fast and works well for certain applications that have precise search terminologies (such as legal and medical applications). Other search techniques such as vector space and neural network search techniques apply more sophisticated comparisons involving joint usage of terms within documents. These techniques are powerful for automatically grouping documents by their likely topic area (document clustering).

Web-search engines generally scan the Web and generate a substantial index that can be subsequently searched in response to a user's query. In order to support a relatively complete search over a collection of documents, the derived document collection index may store a list of the terms, or individual words, that occur within the indexed document collection. Words, particularly simple verbs, conjunctions and prepositions, are often preemptively excluded from the term index as presumptively carrying no informationally significant weight. Various heuristics can be employed to identify other words that appear frequently within the document collection and which contextually differentiate documents in the collection.

These search engines can also compute a relevancy score based on the combined frequency of occurrence of the query terms for each document. Such an approach presumes that increasing occurrences of specific query terms within a document means that the document is more likely to be relevant and responsive to the query. A query report listing the identified documents ranked according to relevancy score is then presented to the user. The report listing can be voluminous and can require the user to sift through numerous documents to locate particular documents of interest.

An increasing amount of Web content is evolving from text-based documents to multimedia documents which include video clips and sound files. This is due in part to the fact that certain perishable and high value-added information such as news on business, sports, current events and entertainment is best presented in audio-visual form and multimedia form rather than text form. Examples of sources of audio-visual/multimedia information include television feeds, cable feeds, radio feeds, and computer generated multimedia feeds. Text-based search engines typically cannot search these multimedia sources of information.

SUMMARY

A natural language information querying system includes an indexing facility configured to automatically generate indices of dynamically updated text sources based on a predefined grammar and a database coupled to the indexing facility to store the indices.

Implementations of the invention include a query engine coupled to the database to respond to a natural language query.

In another aspect, a method for providing information in response to a natural language query, includes extracting information from an updated text corpus based on a predefined grammar; and creating a stored indexed text corpus adapted to permit natural language querying.

Implementations of the above aspect include one or more of the following. The method includes searching the stored index for the text corpus based on the natural language query. The information extracting step includes creating templates associated with one or more events and relationships associated with a topic. The method can update the index by applying a speech recognizer to a multimedia stream. The method also includes creating a summary for each document in a group of documents; quoting a relevant portion of each located document in a summary; or annotating the output by group in a summary. Where the stored index for the text corpus resides on a server, the method further includes sending the natural language query from a mobile device such as a handheld computer; and receiving a natural language response from the server and forwarding the response to a user. The response can be converted to speech using a text-to-speech unit. The natural language query can be captured using a speech recognizer or a handwriting recognizer. The query and the text corpus can relate to locating competitive intelligence information, litigation support information, products on-line, medical information, legal information, electronic commerce information, educational information, financial information, investment information, or information for a vertical market application, among others.

In another aspect, a system for providing information in response to a natural language query includes an information extraction engine adapted to index an automatically updated text corpus based on a predefined grammar; a database coupled to the information extraction engine to store the index output; and a natural language query engine coupled to the database to search the index in response to the natural language query.

Implementations of the above aspect include one or more of the following. A data acquisition unit can be coupled to the information extraction engine to automatically update the text corpus. The data acquisition unit can receive data from any of the following in any combination: a web crawler, a news service, or a search engine, for example. The grammar can be based on events and relationships associated with a topic. The grammar can comprise pattern-action rules, or it can comprise one or more rules to specify a proper noun, a complex word, a phrase, as well as a domain event. The grammar can also comprise one or more rules for merging partial information from different parts of a document. The index for the text corpus can be searched using natural language querying. The natural language querying can be based on a query grammar. The query grammar can be associated with a topic. The query grammar can be represented as pattern-action rules. A query reply generator can be coupled to the natural language query engine to format the output of the search. The query reply generator can create a summary of the output for each document in a group of documents. The query reply generator can quote a relevant portion of each located document in a summary or can annotate the output by group in a summary. The query reply generator can also highlight a relevant portion in each located document. A network, such as the Internet, can be coupled to the natural language query system. One or more clients can be coupled to the natural language query engine. Each client can be a mobile computer. The handheld computer can transmit a natural language query to the natural language query engine and receive a distilled natural language response from the natural language query engine. The client can have (1) a speech recognition engine adapted to convert user speech to the natural language query and/or (2) a text-to-speech engine adapted to convert the result of the search to speech. The text corpus can be generated through computer recognition of spoken language.

The system can have a multimedia data source having a sound stream and a corresponding video stream; and a speech recognizer coupled to the multimedia data source and the data acquisition unit, the speech recognizer converting the sound stream to a text stream and delivering the text stream to the data acquisition unit. The multimedia data source can be one of a digital video disk, a videotape, a television transmission source, and a cable transmission source. The client can also have a pen input engine adapted to convert user handwritings to the natural language query.

Advantages of the invention include one or more of the following. The invention provides natural and succinct interactions for users through its natural language interface, which can respond to natural language queries with natural language answers. The invention is easy to use since it does not require users to learn cryptic search syntax associated with the search criteria. The natural language interface handles commonly encountered natural language expressions, extracts the topic of interest for the user, and performs topical searches beyond the exact words entered by the user.

The natural language query and answer capabilities provide an accurate and user-friendly human interface. Furthermore, the natural language interface is computationally efficient and allows the search engine to support more complex types of queries. In addition to handling natural language queries, the invention enhances the user-friendly human interface with speech recognition and text-to-speech capabilities.

Further, the invention is efficient to use since it provides concise summaries of the search results and distilled answers to questions, as opposed to a list of links which requires the user to evaluate the merits of each link. The invention provides answers based on context or topic rather than keywords. Precise responses to queries can be formulated by the invention, even when words in the queries do not exactly match words in the search documents. Because the system is trained in advance to recognize patterns embodied in predefined grammars, the invention can perform topical searches efficiently and accurately. The invention achieves a fast run-time, due in part to the use of templates which provide direct links between the texts being analyzed and the data extracted.

Additionally, the information database searched by the invention can be automatically updated in real-time. For example, the information database can accept continuous updates from web crawler retrieval as well as real-time news services. This ability allows the invention to provide answers that are always up-to-date. The updates to the invention's database can be performed with little overhead. Once appropriate topical filters relating to the information have been set-up, the system operates autonomously. Thus, the invention is inexpensive to operate and is scaleable.

By providing the search results, along with a concise summary, to users in a timely fashion, the invention provides users with high quality, properly packaged information that can assist users in making their decisions. The invention, with its distilled responses to queries, can operate within the confines of handheld computing devices and telephone handsets, which have limited output capabilities. As such, mobile users can use their handheld computers or telephones to search and access information. Concise summaries and close search results can be delivered in a natural, friendly voice. Thus, the invention supports a pleasant computing experience for mobile users.

Moreover, the invention can operate with multimedia sources of information such as television and cable feeds, as its natural language search facility supports accurate and fast searches for multimedia sources of information. Thus, a comprehensive, full-content search of multimedia information sources can be performed using the invention.

Other features and advantages will become apparent from the following description, including the drawings and the claims.

BRIEF DESCRIPTION OF THE DRAWINGS

FIGS. 7 and 8 are exemplary outputs by the system of FIG. 1.

DETAILED DESCRIPTION

Figure 1:
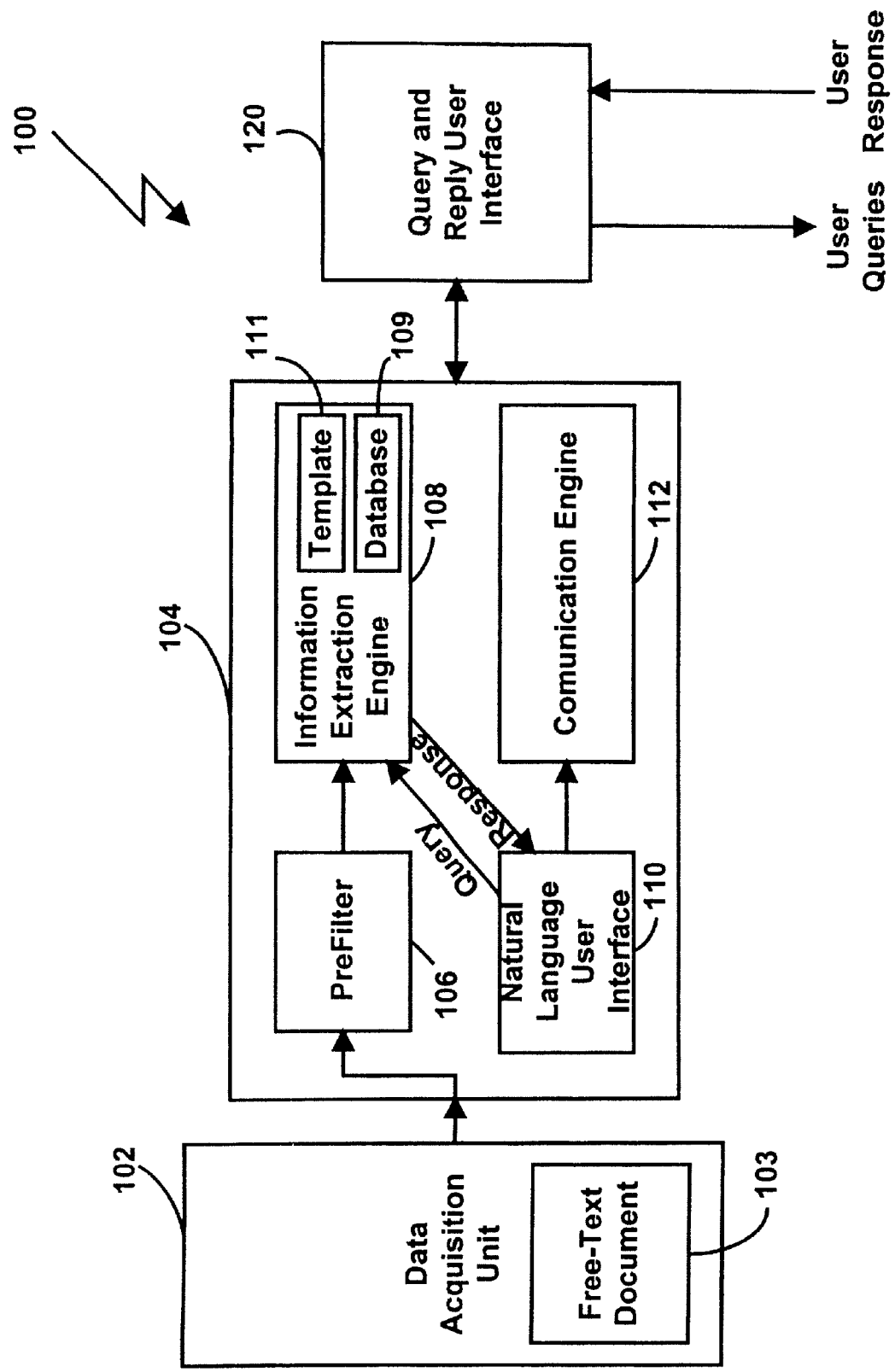
FIG. 1 is a diagram of a natural language information retrieval system.

FIG. 1 shows a system 100 for providing information in response to a natural language query from one or more users. The system of FIG. 1 has a data acquisition system 102 for storing a corpus 103 of documents expressed as natural language texts (free-texts). The corpus 103 of free-text documents stored in the data acquisition system 102 can be continuously updated through a combination of web crawlers, news services, specialized databases, and manual or the results of one or more automated Internet search engine queries. The corpus 103 can capture documents that are already in text format, or can capture text from a multimedia source (such as video or television/radio transmissions) using a suitable converter such as a speech recognizer or a closed-caption decoder, as discussed in more detail below. For a multimedia source, the text is stored with markers pointing to segments of the multimedia source to facilitate retrieval of the segments associated with the text.

These documents can also be physically copied to a local file system, or can be remotely accessed from their original site. The output of the data acquisition system 102 is provided to an information extraction and query engine 104. The information extraction and query engine 104 can have a prefilter unit 106 to perform preprocessing selection of potentially relevant texts (presearch filtering). The presearch filtering operation includes format conversion and categorization of information from the data acquisition system 102. The information extraction and query engine 104 also includes an information extraction engine 108. As explained in more detail below, the information extraction engine 108 identifies events, entities, and relationships using natural language parsing. The information extraction engine 108 also includes a database 109 for storing indices for the text associated with the extracted information from the data acquisition system 102 and the prefilter unit 106.

During a set-up phase, the information extraction engine 108 parses free-text documents to identify topics (events and relationships of interest) and objects (people, organizations and locations, among others) involved in those events and relationships. The topic and associated objects are defined and constructed by an analyst when the system 100 is set up, as discussed in more detail in FIG. 2.

An example of a topic (joint ventures) and associated objects is shown below.

{Company/ies} {Set-up} {Joint-Venture} with {Company/ies}.

From the rules, one or more templates can be generated. An exemplary simplified template schema for a topic on mergers may look as follows:

Acquisition-Event:
  Buyer:
  Acquired:

where each "" is a slot. Each slot may contain specific requirements to insure proper data entry. For example, in the above example, each slot can be defined to accept only company noun groups.

The execution of the topic rules fills information into slots in the schema, which are then stored in template files. An exemplary template for the sentence "IBM acquired Microsoft", or equivalently "Microsoft was acquired by IBM" may be:

Acquisition-Event:
  Buyer: IBM
  Acquired: Microsoft

Once processed, the extracted information is stored and organized in the database 109, which can be a relational database, to facilitate searches on combinations of topics and objects. An exemplary table in the relational database can be an M&A Table as follows:

| event type | A | Text Source | ... |
|---|---|---|---|
| Acquiror | IBM | 90:3 | ... |
| Acquired | MICROSOFT | 104:8 | ... |
| . | . | . | . |
| . | . | . | . |
| . | . | . | . |

During operation, in response to a query such as "Has Microsoft been acquired?", the relational database 109 executes an SQL query where Event Type=A (to indicate acquisition as opposed to merger) and Acquired=Microsoft. The query can be stated in a natural language such as English or can be, for instance, menu-driven. Moreover, as described in more detail below, an operation similar to the above operation can be used to extract concepts from a natural language such as an English question and convert that question into an SQL query. After the SQL query is executed, the texts satisfying the query are retrieved by looking-up the Text Source and the remaining columns. The results are then summarized, highlighted and provided to the user in a distilled manner, as shown in FIGS. 7 and 8.

Optionally, the text files can also be tagged with Extensible Markup Language (XML) directives to support features such as content-sensitive text highlighting within browsers, as well as integration with other XML-compliant document management and search systems. In one embodiment, the information extraction engine may be the Finite State Automation Text Understanding System (FASTUS) system available from SRI of Menlo Park, Calif., which extracts information from natural language text for entry into a database.

The output of the information extraction engine 108 is provided to a communications engine 112 to handle various communications protocols such as Hypertext Transfer Protocol (HTTP). The communication engine 112 also receives input from a natural language query user interface 110. The natural language user interface 110 processes data from a query and reply user front end 120. The query and reply front end 120 converts user queries, which can be natural language queries, or search terms, into an internal query format and submits the query to the information extraction and query engine 104. Exemplary natural language queries can be "Tell me about joint ventures involving SBC in the Communications Services Sector" or "Did Barnes & Noble acquire anyone this year?" Exemplary search term queries can be "'joint ventures' AND SBC" or "'Barnes & Noble' AND buy OR purchase."

In response, the information extraction and query engine 104 performs a database search and returns the result to the natural language user interface 110. The natural language user interface 110 in turn sends this information to the communication engine 112. The output of the communication engine 112 is provided to the query and reply front end 120. Embodiments of the query and reply front end 120 can provide natural language responses and can summarize the response.

Prior to operation, the system of FIG. 1 needs to be set-up. During this phase, an analyst reviews a small sample of typical documents of the kind associated with a topic to be supported by the system 100. The topic may be specific, such as mergers and acquisitions, or may be more general, such as issues in education, medicine or law. Based on the document review, the analyst formulates a set of rules. In one embodiment, the rules are specified using a declarative specification language with an execution semantics called FastSpec, whose specification is attached as an appendix below. In one embodiment, the patterns are specified by regular grammars. The applicability of the rules is conditioned on attributes associated with the terminal symbols, and attributes can be set on the objects constructed. In another embodiment, the rules take the form of regular productions that are translated automatically into finite-state machines by an optimizing compiler.

Using the declarative pattern language, application-independent, clause-level patterns can be instantiated by application-specific instances. Typically, these instances are tied to the argument structure of the topic-relevant verbs, that is, what kinds of things they take as agents and what kind, as objects and how these relations are expressed. The rules to instruct the system on how free text is to be processed can be PATTERN==>ACTION rules. For example, in the context of joint-ventures, one text pattern to recognize may be:

{Company/ies} {Set-up} {Joint-Venture} with {Company/ies}.

Additional rules are specified so that {Company/ies} covers all expected variations of company names that may appear. Similarly, all known variations of {Set-up} and {Joint-Venture} are specified so that the idea or concept underlying the query can be searched. The "ACTION" rules eventually produce templates that contain or represent the information in the texts, as well as containing information about the text (e.g., the location of the text in the source material).

Figure 2:
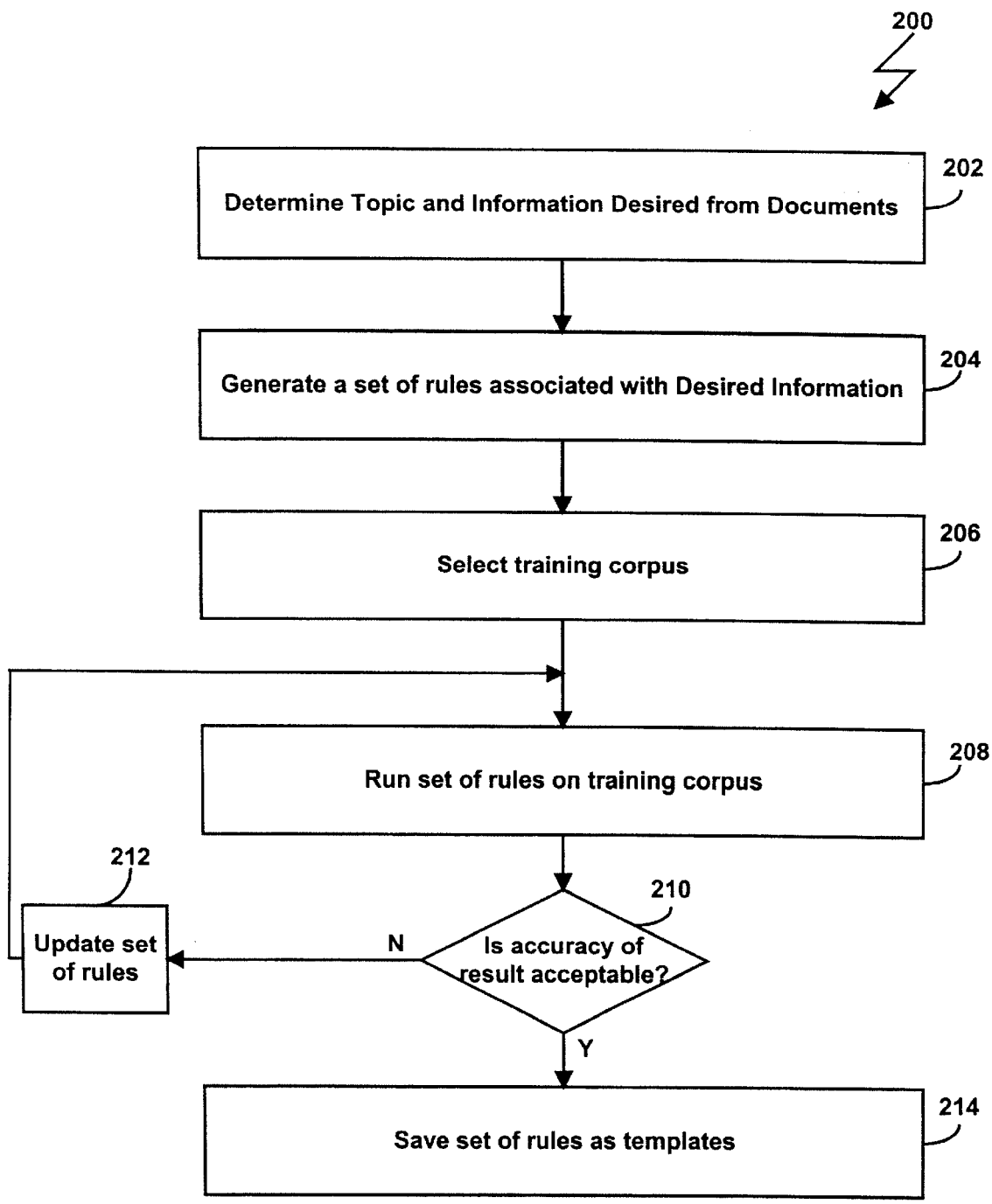
FIG. 2 is a flowchart of a process for setting up the system of FIG. 1.

FIG. 2 shows a process 200 for setting up the system of FIG. 1. First, based on the selected topic that the system 100 is expected to process, an analyst determines the type of information desired (step 202). Next, the analyst generates a set of rules in accordance with the desired information (step 204). A training corpus of typical documents is then selected (step 206), and the set of rules generated in step 204 is executed on the training corpus (step 208). The analyst then checks whether the accuracy of the result generated by the set of rules is acceptable (step 210). If not, the rules are revised (step 212) and the process 200 loops back to step 208 to continue training the system. From step 210, if the accuracy is acceptable, the rules are then saved (step 214). These grammar files are then run against texts and the results are translated into entries in the database 109, which are subsequently used to provide information in response to a query. In this manner, a corpus is processed to yield a set of templates representing various topic-specific information contained in the texts and relating that information back to the texts.

Figure 3:
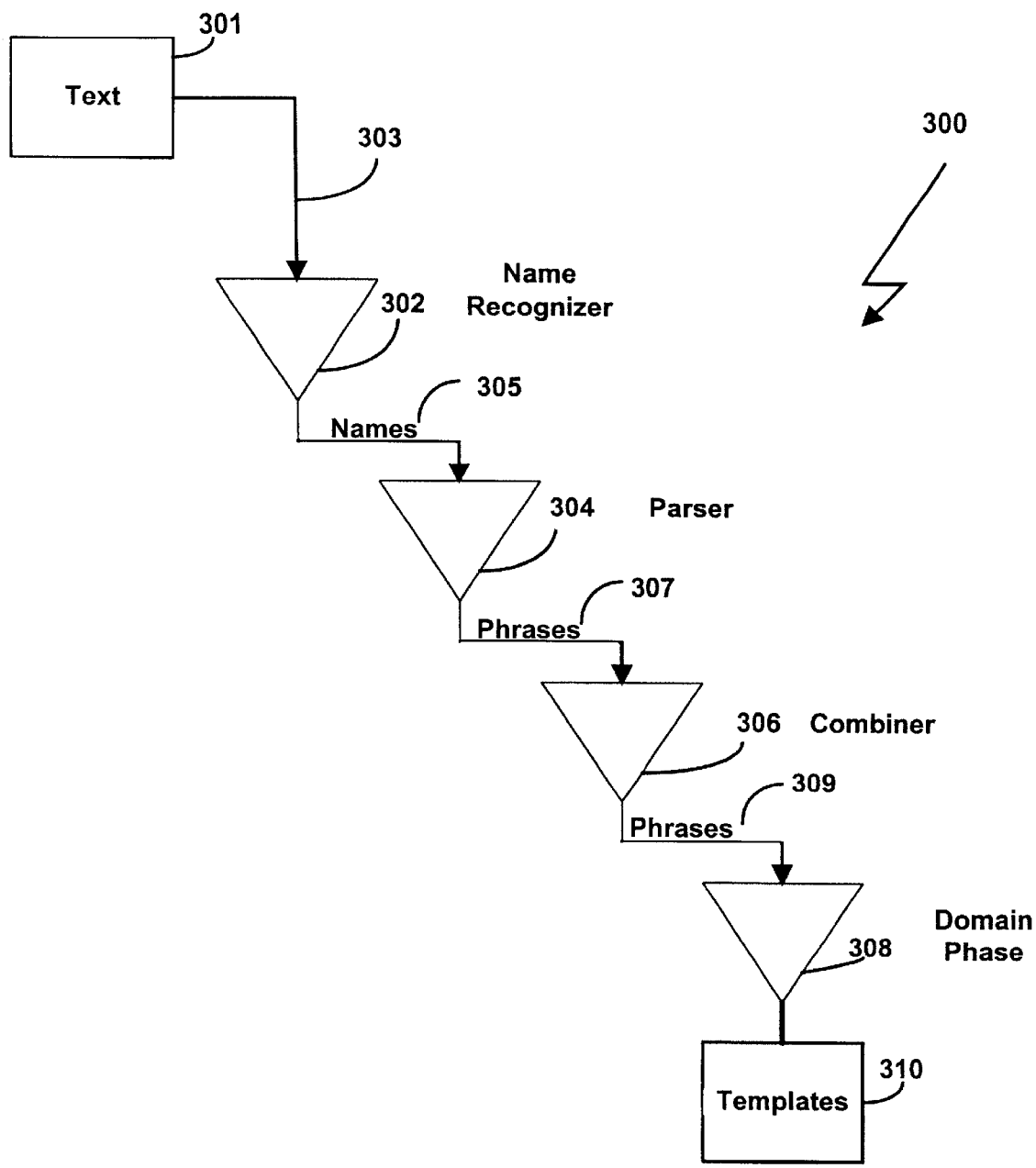
FIG. 3 is a block diagram illustrating a finite state automation associated with the system of FIG. 1.
Figure 4:
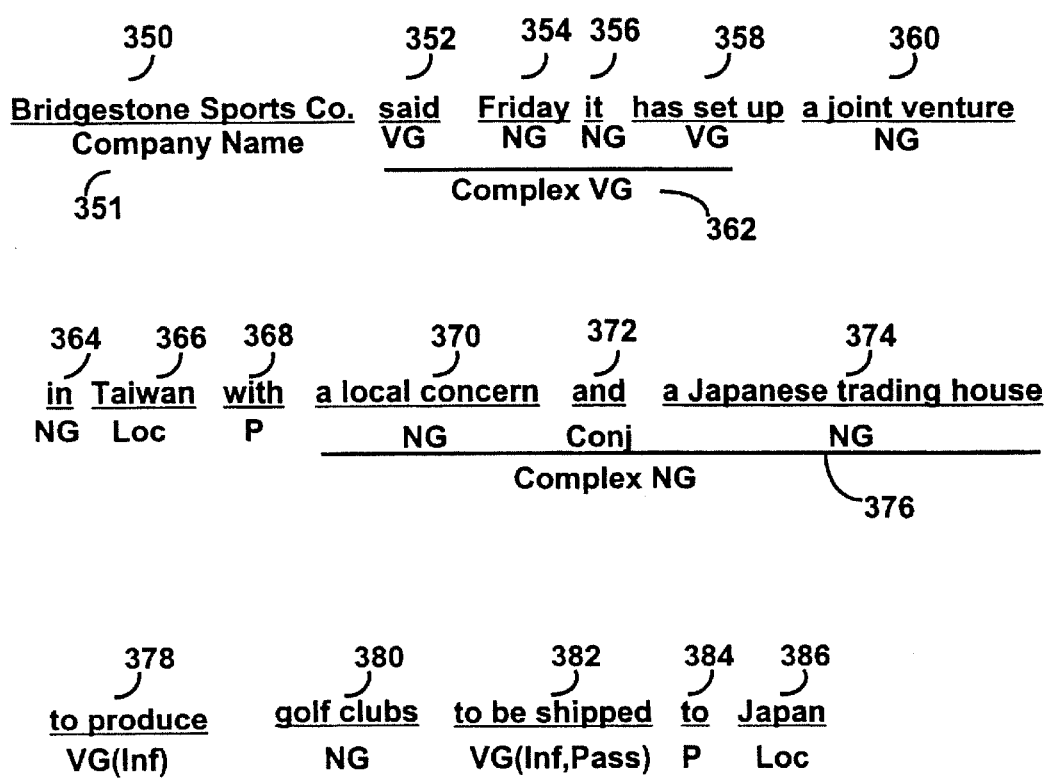
FIG. 4 illustrates the classification of an example sentence using the automation of FIG. 3.

FIG. 3 shows a cascaded, nondeterministic finite state automation 300 for processing natural language text in the information extraction engine 108, while FIG. 4 shows an exemplary sentence which is operated upon by the automation 300 to illustrate its operation. In the automation 300, successive stages of processing are applied to the input, patterns are matched, and corresponding composite structures are built. The composite structures output by each stage are provided as input to the next stage. First, names and other fixed form expressions are recognized. Next, basic noun groups, verb groups, and prepositions and some other particles are recognized. Certain complex noun groups and verb groups are then constructed, patterns for events of interest are identified and corresponding "event structures" are built. Finally, distinct event structures that describe the same event are identified and merged, and these structures are used in generating entries in the database 109. This decomposition of language processing enables the system to perform an appropriate amount of domain-independent syntax, so that domain-dependent semantic and pragmatic processing can be applied to appropriate larger-scale structures.

Referring to FIG. 3, the automation 300 receives free text from the free-text document 103 of the data acquisition unit 102 (FIG. 1). The free text is transformed into a sequence of text tokens 301, which is provided to a name recognizer 302. The name recognizer 302 identifies and extracts names 305 and acronyms as well as multi-words such as "because of" that are combined to form single lexical items from the text 301. The output 305 of the name recognizer 302 is provided to a parser 304 for handling basic phrases 307. The parser 304 constructs basic syntactic constituents of the language, consisting only of those that can be nearly unambiguously constructed from the input using finite-state rules (i.e., noun groups, verb groups, and particles).

The output 307 of the parser 304 in turn is provided to a combiner 306. The combiner 306 handles complex phrases 309 such as complex noun groups and complex verb groups. The combiner 306 produces larger constituents from the output of the parser when it can be done fairly reliably on the basis of local information. Examples are possessives, appositives, "of" prepositional phrases ("John Smith, 56, president of IBM's subsidiary"), coordination of same-type entities, and locative and temporal prepositional phrases.

The name recognizer 302, the parser 304, and the combiner 306 are mostly domain independent. The output 309 of the combiner is eventually provided to a domain phase transducer 308, which is domain dependent. The domain phase transducer 308 scans the sequence of phrases for patterns for events of interest to the topic being searched, and when they are found, builds structures that encode the information about entities and events contained in the pattern. A merge phase 306 merges structures arising from different parts of the text if they provide information about the same entity or event. The output of the domain phase transducer is stored as one or more templates 310.

The automation 300 thus divides the natural-language handling process into separate levels for recognizing phrases and recognizing event patterns. Phrases can be recognized reliably with syntactic information, and they provide precisely the elements that are required for stating the event patterns of interest. The earlier stages of the automation 300 recognize smaller linguistic objects and work in a largely domain-independent fashion. They use linguistic knowledge to recognize that portion of the syntactic structure of the sentence that linguistic methods can determine reliably, requiring little or no modification or augmentation as the system is moved from domain to domain. The later stages take these linguistic objects as input and find domain-dependent patterns among them.

FIG. 4 shows an exemplary sentence used to illustrate the operation of the cascaded nondeterministic finite state automation 300. In FIG. 4, "Bridgestone Sports Co. said Friday it has set up a joint venture in Taiwan with a local concern and a Japanese trading house to produce golf clubs to be shipped to Japan." In this sentence, the phrase "Bridgestone Sports Co." 350 is classified by the automation 300 as a company name 351. A company name 351 can also include acronyms as well as corporate status. For instance, if the text for the company name 351 is IBM, the company name could also be interpreted as International Business Machines, IBM Corp. or IBM Corporation. The complex phrase of FIG. 4 also includes a complex verb group 362. This complex verb group 362 includes a verb group 352 (said), a noun group 354 (Friday), a noun group 356 (it), and a verb group 358 (has set up) and a following noun group 360 (a joint venture) is detected. The complex phrase of FIG. 4 also includes a preposition/particle 364 (in), a location phrase 366 (Taiwan), a preposition/participle 368 (with). The complex phrase FIG. 4 also includes a complex noun group 376, which includes a noun group 370 (a local concern), a conjunction 372 (and) and a noun group 374 (a Japanese trading house). The complex phrase of FIG. 4 also includes a verb group 378 (to produce) a noun group 380 (golf clubs) and a verb group 382 (to be shipped). The complex phrase of FIG. 4 also includes a participle 384 (to) and a location 386 (Japan).

The operation of the automation of FIG. 3 on the sample text of FIG. 4 is discussed next These are recognized by a multiword tokenizer. First, the name recognizer 302 identifies company names like "Bridgestone Sports Co." and "Bridgestone Sports Taiwan Co." The names of people, locations, dates, times, and other basic entities are also recognized at this level. Languages in general are very productive in the construction of short, multiword fixed phrases and proper names employing specialized microgrammars. However, not all names can be recognized by their internal structure. Thus there are rules in subsequent transducers for recognizing unknown possible names as names of specific types.

The next level of processing, performed by the parser 304, handles basic phrases such as noun groups, verb groups, and several critical word classes, including certain prepositions. This level identifies certain syntactic constructs. One of these is the noun group, that is, the head noun of a noun phrase together with its determiners and other left modifiers. Another is a "verb group," that is, the verb together with its auxiliaries and any intervening adverbs. Verb groups are recognized by a finite-state grammar that tags them as Active, Passive, Gerund, or Infinitive.

In the third stage of processing, by the combiner 306, complex noun groups and verb groups that can be recognized reliably on the basis of domain-independent, syntactic information are recognized. This includes the attachment of appositives to their head noun group, for example "The joint venture, Bridgestone Sports Taiwan Co." In the course of recognizing basic and complex phrases, entities and events of domain interest are often recognized, and the structures for these are constructed. In the sample joint-venture text of FIG. 4, entity structures are constructed for the companies referred to by the phrases "Bridgestone Sports Co.," "a local concern", "a Japanese trading house," and "Bridgestone Sports Taiwan Co." Information about nationality derived from the words "local" and "Japanese" is also recorded.

The input to the fourth stage of processing by the domain phase transducer 308 is a list of complex phrases in the order in which they occur. Patterns for events of interest are encoded as finite-state machines, where state transitions are effected by phrases. The state transitions are driven off the head words in the phrases. That is, each pair of relevant head word and phrase type—such as "company-NounGroup," "formed-PassiveVerbGroup," "bargaining-NounGroup," and "bargaining-PresentParticipleVerbGroup"—has an associated set of state transitions.

The first three stages of processing 302, 304, and 306 all operate within the bounds of single sentences. The final level of processing 308 operates over the whole text. Its task is to see that all the information collected about a single entity or relationship is combined into a unified whole. This is one of the primary ways the problem of coreference is dealt with in this embodiment. The three criteria that are taken into account in determining whether two structures can be merged are the internal structure of the noun groups, nearness along some metric, and the consistency, or more generally, the compatibility of the two structures.

The output of the automation 300 is a set of template files 310 that contain information about the texts, including sources and the day and time of the article, as well as topic-specific information extracted, including the participants in the topic event/relationship (e.g., company names, person names). These items are related to specific segments of text to support the answers. These templates are loaded into a relational database, so that a user can query the system for articles of interested based on the topic area, period of interest and the participants involved in the events/relationships of interest.

An exemplary template 310 will be described next. In this example, the system 100 extracts information from articles about mergers and acquisitions. The following came from a single sentence: "IBM acquires Microsoft."

The desired information, in this case corporate buyers and sellers, is represented as transitions with a start state and an end state. The remaining information in the template is meta-data, e.g., data about the location in the text (by character position) of the various linguistic elements that supply the source of the extracted information. (For example, 261: 18 means that the relevant linguistic element starts at the position of the 261st character in the article and goes on for 18 characters.)

Turning now to the sentence "IBM acquired Microsoft," the template 310 might look as follows:

```
<MNA_EVENT-NIL-1>
    COMPANIES:              <ORGANIZATION-NIL-1>*
<ORGANIZATION-NIL-2>        {0:3,13:9 * 0:3,13:9}
    AGENT:                  IBM                  {0:3}
    ACQUIRED:               Microsoft            {13:9}
    EVENT_TYPE:             MNA                  {0:3,4:8,13:9}
    EVENT_DESC:             IBM acquired Microsoft  {0:22}
    EVENT_SENTENCE:         IBM acquired Microsoft  {0:22}
<ORGANIZATION-NIL-1>
    NAME:                   Microsoft            {13:9}
    TYPE:                   COMPANY              {13:9}
    ALIASES:                Microsoft            {13:9}
<ORGANIZATION-NIL-2>
    NAME:                   IBM                  {0:3}
    TYPE:                   COMPANY              {0:3}
    ALIASES:                IBM                  {0:3}
```

In another exemplary template 310, the system 100 extracts information from newspaper articles about high-level management changes in private companies. From a single sentence: "Penelope Muse Abernathy, 41, the Times newsroom business manager, was named vice president, planning, a new post", the system 100 is to extract information relating to management changes. The desired information on management changes, can be represented as transitions with a start state and an end state. Each state, in turn, has three main elements: a person, a position, and an organization (company). Using this example, transitions come in two flavors:

(1) PERSON_PIVOT: wherein the person in each of the two states is the same, but where at least one of position/organization change; and (2) POSITION_PIVOT: where the position-company are the same, but the person who fills that position changes.

Figure 5:
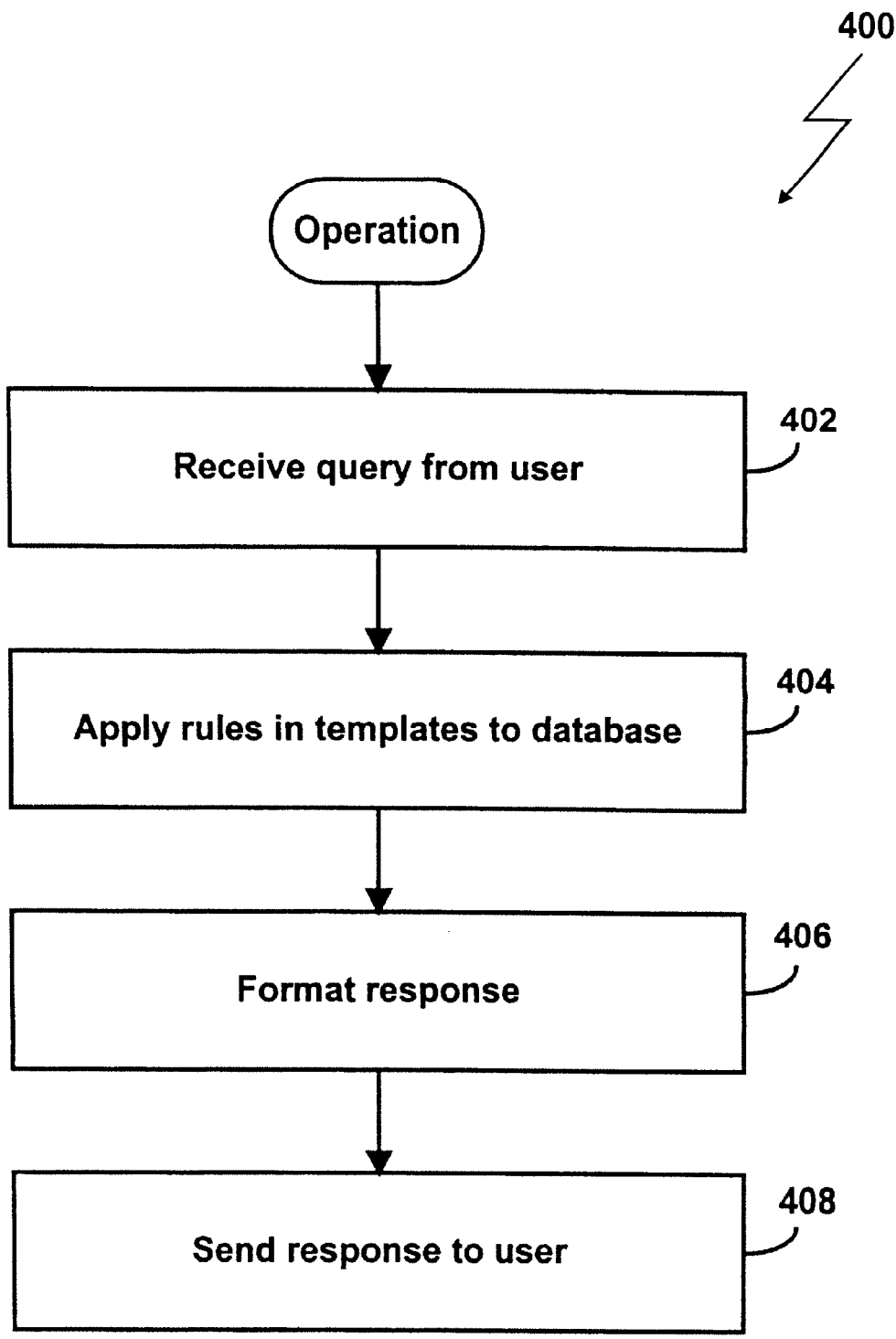
FIG. 5 is a flowchart illustrating a process for operating the system of FIG. 1.

Referring now to FIG. 5, a process 400 illustrating the usage of the system of FIG. 1 is detailed. First, the user submits a natural language query to the system 100 (step 402). As discussed earlier, an exemplary natural language query can be "Tell me about joint ventures involving SBC in the Communications Services Sector" or "Did Barnes & Noble buy anyone this year?" The natural language query is parsed by the natural language user interface 110. A variety of natural language parsers can be used. In one embodiment, the natural language interface 110 executes one or more query grammar files which are analogous to the grammar files 310 associated with the search system 100. The output from executing the query grammar files is used to generate database queries with one or more search parameters corresponding to the natural language queries.

Although a natural language query interface is shown in FIG. 5, a menu-driven interface can also be used to request information. A typical query would request information on a specific topic (such as mergers, joint ventures, etc.), pertaining to a specific participant (companies such as Chevron or sectors such as the Integrated Oil Section), and within a given period. The menu-driven interface allows the user to enter these parameters directly into pre-specified fields. For example, the menu-driven interface can have a field called topic where the user can enter "joint ventures" and a second field called company name where the user can enter "Chevron."

Once the system 100 receives a natural language query from the user, natural language rules are applied to the database (step 404). This is done by matching the query against the grammar files generated in step 214 of FIG. 2. Information contained in grammar files is used to generate a database query which is submitted to the database in the information extraction engine. The database executes a query and returns an output associated with the query. The result is then formatted (step 406). The formatting includes highlighting relevant portions of the text as well as summarizing the results in a natural language such as English. Next, the formatted response is sent to the user (step 408).

Figure 6:
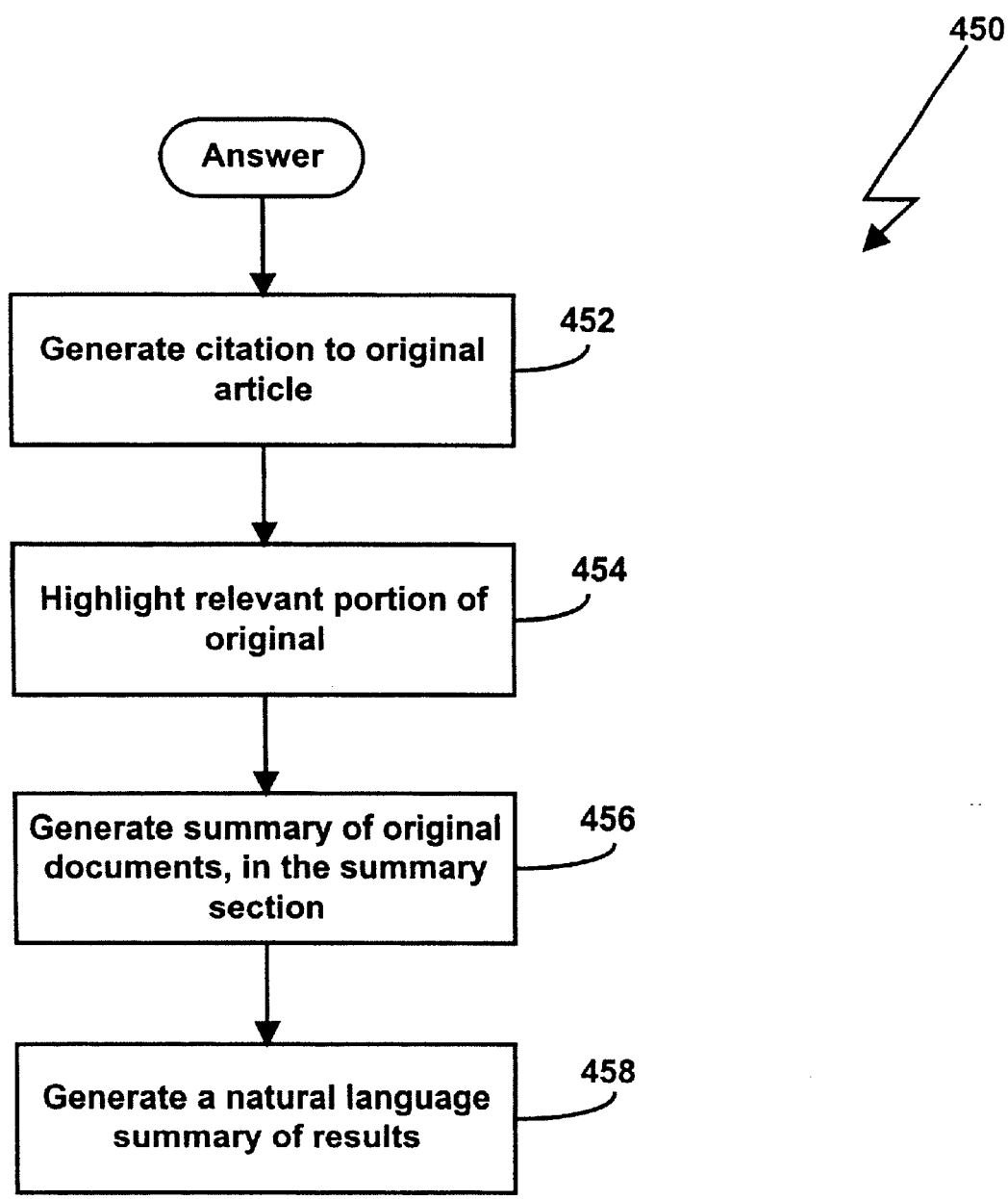
FIG. 6 is a flowchart illustrating a process for using a natural language summary of the output of the system of FIG. 1.

FIG. 6 illustrates a process 450 for formatting an answer to a query. The process 450 generates a citation to the original article (step 452). The citation may be in the form of a hyperlink. Additionally, the process 450 highlights one or more relevant portions in the original article (step 454). The process 450 then generates a summary of the original document in the summary section (step 456). Finally, a natural language summary of results found in response to the search is generated (step 458). In this manner, the system succinctly answers the user's query, and links are provided to allow the user to view the entire source document, if desired.

The output of the process 450 is illustrated by an example, shown in more detail in FIGS. 7–8. As illustrated in FIGS. 7–8, a user looking for information relevant to the topic of joint ventures can pose a natural language question, (e.g., "Tell me about joint ventures involving SBC in the Communications Services sector") in a text input box 500. The query is analyzed and a query is submitted to the database 109 in the information extraction engine 108 (FIG. 1).

The distilled result is provided to an output box 502. First, a short summary box 504 is shown illustrating a particular group of search results, in this case a group of documents (shown with one document) involving Telefono de Mexico S.A. de C.V. and SBC. The response to the question takes the form of a brief phrasal summary of the information (e.g., "Joint Ventures involving Telefonos de Mexico S.A. de C.V. and SBC Communications Inc.") in the summary box 504.

The full article can be retrieved by clicking on the hyperlink in a box 506. When the hyperlink in the box 506 is clicked, the full article is retrieved and is shown in FIG. 8. Particularly, a section 508 relevant to the inquiry entered into the box 500 of FIG. 7 is highlighted. That way, the user can quickly review the section of the text that is most pertinent to his or her search request. In this example, citations from the texts of the relevant passages (e.g. "New York Times, Fri. 14 May 1999 13:21:59 PDT: . . . The announcement also noted that SBC had formed a joint venture with Telefonos de Mexico S.A. de C.V. ('Telmex') to effect the acquisition . . . ") are shown in the box 506. The citation itself is a hyperlink pointing to the source texts, in which the relevant sections are highlighted.

In one embodiment, the language of the natural language query can differ from the language of the searchable documents as well as the language of the natural language reply. For instance, a German user can enter a natural language query in German. The German query can be parsed by a grammar set up to parse German queries, and the resulting query can be applied to documents that can be in Japanese, English, and German, or any other languages. The result of the search can then be summarized in German for the user to review.

Figure 9:
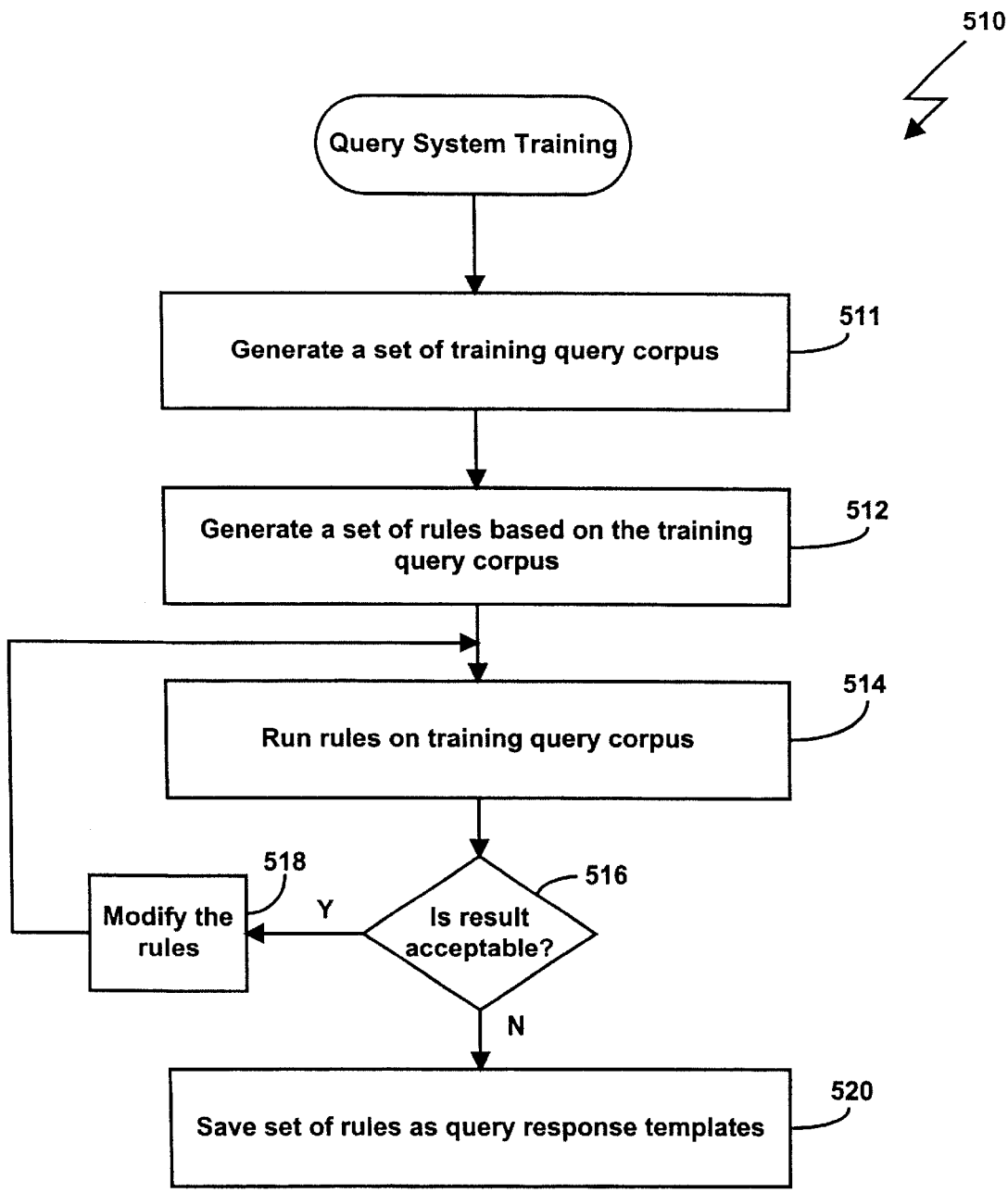
FIG. 9 is a flowchart illustrating a process for setting up a system for passing natural language queries.

FIG. 9 illustrates a process 510 for training the natural language user interface 110 of FIG. 1. The process 510 is a variant of the process 200 of FIG. 2, except that the process 510 is specific to various natural language queries that a user may enter. The process 510 produces a set of rules which identify in advance various natural language queries that users are likely to use. The rules are distilled in one or more query grammar files, which are invoked in response to a query. The grammar files are used to generate one or more database queries, which are submitted to a query database (not shown). The query database in turn generates one or more search parameters which are submitted to the information extraction engine 108 (FIG. 1).

Turning now to FIG. 9, a corpus of training queries is generated (step 511). The corpus may be captured from natural language queries submitted from user search sessions and classifying the natural language queries into a set of rules (step 512). The rules are then executed on the training query corpus (step 514). The rules are tested to see how well they handle the queries (step 516). If the result is not acceptable, the rules are then updated (step 518) and the updated rules are then executed on the training query corpus (step 514). From step 516, if the results are acceptable, the set of rules are saved as one or more query grammar files (step 520).

Figure 10:
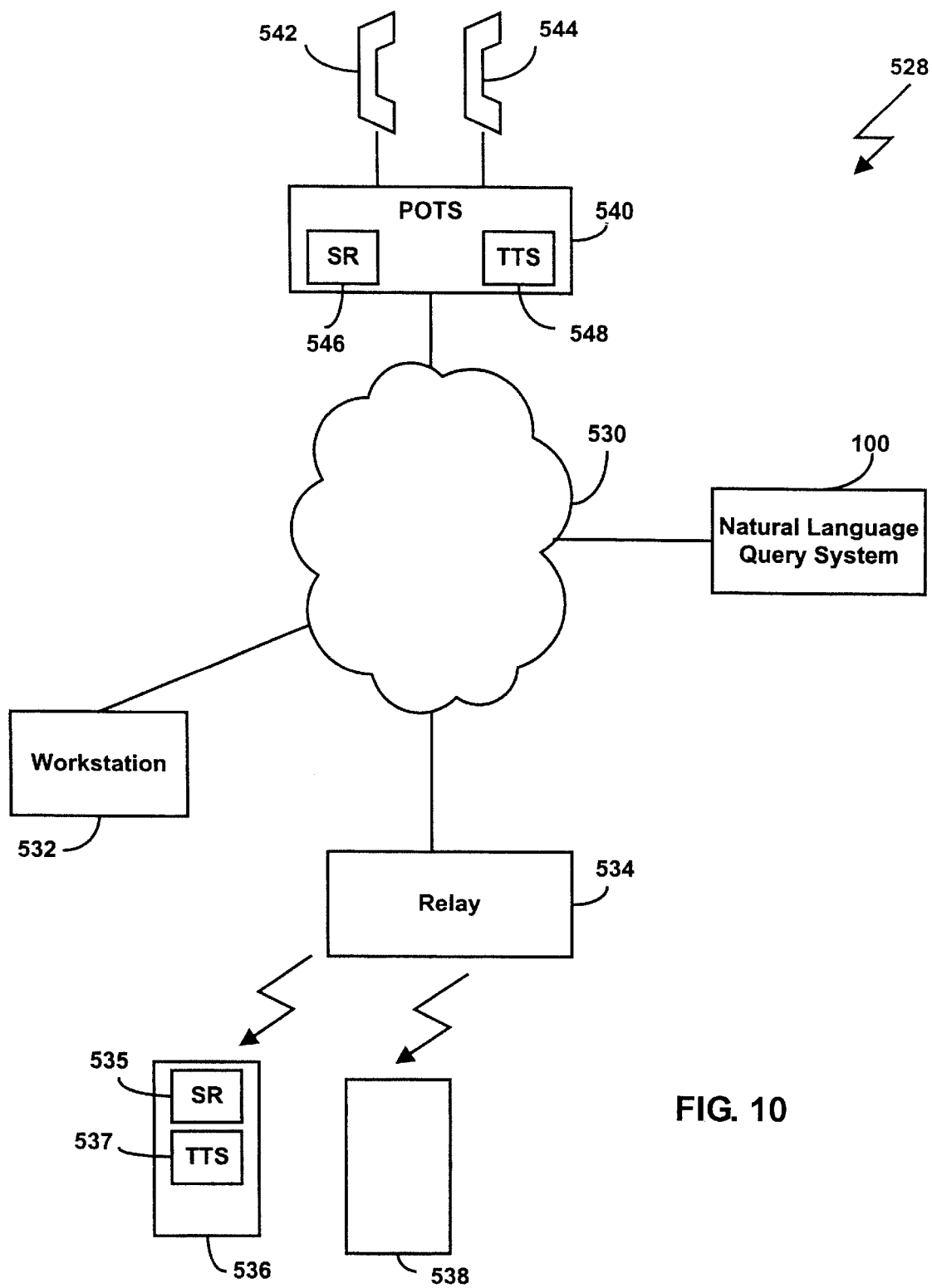
FIG. 10 illustrates one exemplary operating environment for the system of FIG. 1.

FIG. 10 shows an exemplary operating environment for the system of FIG. 1. In FIG. 10, the natural language query system 100 is connected to a network 530. The network 530 can be a local area network or a wide area network such as the Internet. One or more workstations 532 are connected to the network 530. A user can enter a natural language query or other suitable search parameters into an application software such as a browser. The query or search parameters are then communicated from the workstation 532 to the system 100 over the network 530.

Additionally, to serve mobile users, a relay station 534 is connected to the network 530. The relay station 534 communicates with mobile devices such as handheld computers 536 and 538. The communication between the relay station 534 and the remote computers 536 and 538 may be performed wirelessly using radio transmissions or optically using infrared beams, among others.

Each of the mobile devices or handheld computers 536 and 538 has a processor, memory, a small display, a data storage device, and suitable input/output devices such as a pointing device, a keyboard, a microphone, a speaker, and parallel/serial/infrared ports, among others. The handheld computers 536–538 can include the 3Com Palm, HP 200 LX, the Psion 3a, the Sharp Zaurus, and Windows CE handheld units. Instead of a mouse or other pointing device, the display can provide a resistive touch surface. This lets the user use a simple plastic stylus or a finger to select various on-screen objects.

Each user query or search parameter can be entered using the keyboard or pointing device of the handheld computer 536 or 538. Alternatively, the user can verbally instruct the handheld computer 536 or 538 with the query or search parameter. In this case, the handheld computer 536 or 538 can execute a speech recognizer 535 that maps the user's voice to a set of reference patterns representing the phonetic and phonological descriptions of speech previously obtained from training data. In order to perform this mapping, signal processing techniques such as Fast Fourier Transforms (FFT), Linear Predictive Coding (LPC), or filter banks can be applied to a digital form of the speech signal to extract an appropriate parametric representation of the speech signal. A commonly-used representation is a feature vector containing for each time interval, the FFT or LPC coefficients that represent the frequency and/or energy bands contained in the speech signal. A sequence of these feature vectors is mapped to the set of reference patterns which identify linguistic units, words and/or sentences contained in the speech signal. The speech recognizer can also run probabilistic models and statistical techniques to predict the intended message. One such technique deploys Hidden Markov Models (HMMs) that determine the reference pattern that will more likely match the speech signal rather than finding an exact match.

Once the system 100 returns text associated with the query, the text can be shown to the user on the display. Because the system 100 provides a concise summary along with documents that are responsive to the query, the user can easily review the resulting text on the small display of the handheld computer.

Alternatively, the result can be provided to a text-to-speech (TTS) system 537 which translates the text to speech for the user to hear. The TTS system 537 looks up each word in a dictionary and causes a sequence of natural speech segments to be played on a speaker. The sequence can be a sequence of phonetic segments as well as diphones, or units that contain the transition between two adjacent phonetic segments. A suitable TTS system is the Bell Labs TTS system, among others. Through the speech recognizer 535 and the TTS system 537, the handheld embodiment of FIG. 10 supports alternative modes of input and output to the handheld computer to allow users access to information that is most important to them, at any time and from any location.

Additionally, to serve mobile users who have access to the public telephone network, a plain old telephone service (POTS) station 540 may be connected to the network 530. The POTS station 540 supports handsets 542 and 544. As each user speaks into the handset, user speech is forwarded to the POTS station 540. A speech recognizer 546 at the POTS station 540 converts the speech to text and forwards the text to the natural language query system 100. Responses from the natural language query system 100 in turn is provided to a text-to-speech unit 548 which converts the answers to spoken language suitable for delivery over the telephone network. In this manner, the handset embodiment of FIG. 10 supports ubiquitous computing by allowing natural language searches, even if the user does not have access to a computer. As in the case of handheld computers, the results provided by the system 100 are concise and accurate so that the outputs of the system 100 can be communicated over the telephone. The handset embodiment of FIG. 10 supports ubiquitous computing by allowing natural language searches, even if the user does not have access to a computer. As in the case of handheld computers, the results provided by the system 100 are concise and accurate so that the outputs of the system 100 can be communicated over the telephone.

Figure 11:
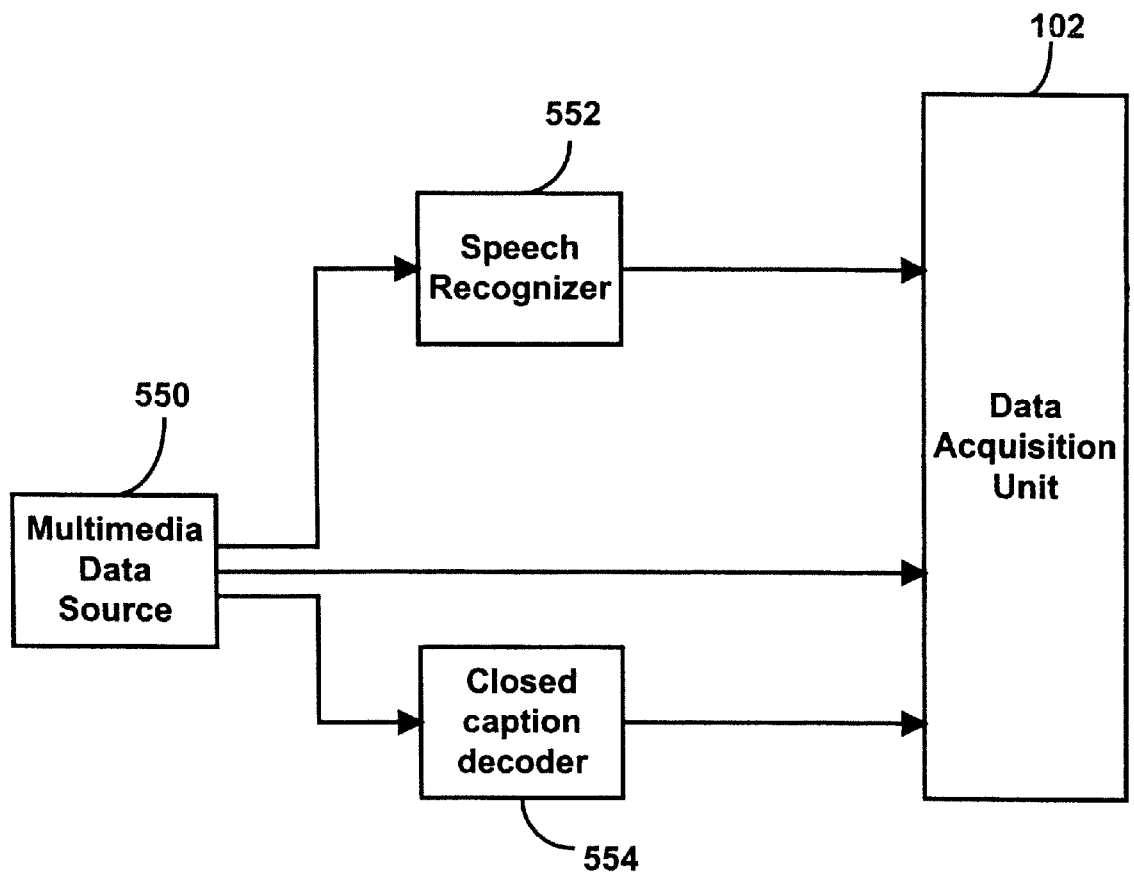
FIG. 11 is a diagram illustrating one embodiment to acquire multimedia data for a data acquisition unit of FIG. 1.

FIG. 11 shows one embodiment for providing data to the data acquisition unit 102 of FIG. 1. In FIG. 11, a multimedia data source 550 provides a stream of multimedia data. The stream may be a video stream, a sound stream, or others. The output from the multimedia data source 550 is provided to the data acquisition unit 102. Additionally, a speech recognizer 552 and a closed captioned decoder 554 is connected to the multimedia data source. Although the system of FIG. 11 shows both the speech recognizer 552 and the closed caption decoder 554, the system of FIG. 11 can still operate with only one of the two units present.

Since the operation of the speech recognizer 552 is already discussed, it will not be repeated here. With respect to data sources with closed-captioning, the closed caption decoder 554 generates a word-for-word transcript from a television, VCR, DSS or DVD program. The closed caption decoder 554 deciphers text information embedded in closed-caption transmission. The text data is stored in line 21, field 1 of a video signal's vertical blanking interval (VBI). The information contained in line 21 contains not only raw data but also timing information. After a timing interval which contains a "color burst", a start bit followed by 16 bits of digital information transmitted as two 8-bit words formatted per the USA Standard Code of Information Interchange (USASCII;x3.4-1967) with odd parity. The closed caption decoder 554 converts the 8-bit words into text and deliver the text to the data acquisition unit 102. A variety of decoders can be used, including units deploying the MC144143, available from Motorola Corporation in Phoenix, Ariz. Alternatively, stand-alone units such as the TextGrabber decoder, available from SunBelt Industries Technologies Group, Inc., Jacksonville Beach, Fla., can be used to convert the closed captioned information contained within a television or video signal to text for the data acquisition unit 102.

In addition to speech recognition and close-caption decoding, words appearing in an image can also be extracted using a suitable optical character recognition (OCR) software. Such OCR software looks for captions that naturally appear within the video stream. Additionally, the OCR software can be trained to extract text appearing in the background of the video stream.

The text generated by the speech recognizer 552 and the closed caption decoder 554 is used for cataloging, searching, and retrieving the corresponding video stream. The text extracted from the video stream, along with a time-stamp, is provided to the information retrieval engine and suitably indexed so that when the text is found to be responsive to a particular natural language query, the time-stamp can be used to retrieve the corresponding video stream. Further, audio time stamps can be aligned with time-stamps associated with the processed video stream for subsequent retrieval.

During operation, users can search for video clips by entering a natural language query or specific search terms. In response, the system provides distilled answers to the queries, a list of responsive video clips and concise summaries of the search results. In one embodiment, each clip is identified by a representative keyframe and descriptive text such as annotations, closed caption text or speaker identification. Users can click on one or more links to watch the video clips responsive to the queries and perform a number of built-in actions, such as forwarding the video clip to another user or cutting/pasting the clip into standard enterprise productivity tools such as presentation software, word-processing software, database software or spreadsheet software. In this manner, the embodiment of FIG. 11 supports a highly scalable and searchable video repository whose content can be continuously updated.

Figure 12:
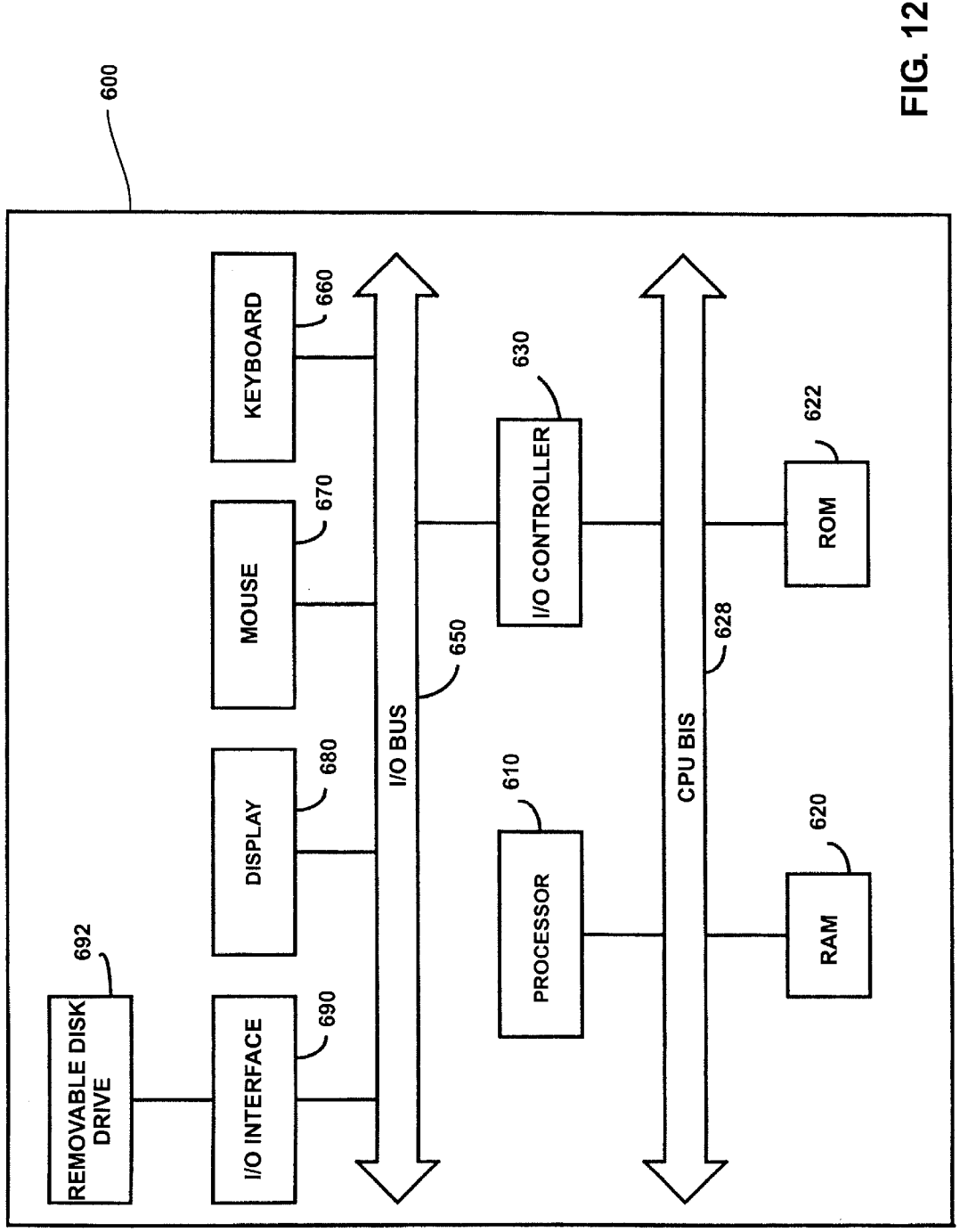
FIG. 12 is a diagram illustrating an exemplary computer system capable of supporting the system of FIG. 1.

The invention may be implemented in digital hardware or computer software, or a combination of both. Preferably, the invention is implemented in a computer program executing in a computer system. Such a computer system may include a processor, a data storage system, at least one input device, and an output device. FIG. 12 illustrates one such computer system 600, including a processor (CPU) 610, a RAM 620, a ROM 622 and an I/O controller 630 coupled by a CPU bus 628. The I/O controller 630 is also coupled by an I/O bus 650 to input devices such as a keyboard 660, a mouse 670, and output devices such as a monitor 680. Additionally, one or more data storage devices 692 is connected to the I/O bus via an I/O interface 690.

Further, variations to the basic computer system of FIG. 12 are within the scope of the present invention. For example, instead of using a mouse as user input devices, a pressure-sensitive pen, digitizer or tablet may be used.

The above-described software can be implemented in a high level procedural or object-oriented programming language to operate on a dedicated or embedded system. However, the programs can be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Other embodiments are within the scope of the following claims.

APPENDIX

FASTSPEC GRAMMAR SPECIFICATION LANGUAGE

The grammar specification metalanguage uses the following metacharacters:

==> rewrites to
( ) optional
* zero or more iteration
+ one or more iteration
{ } for grouping
| alternatives
' ' single quotes enclosing literals, e.g. 'ATOM' (using\'for')
% comment til the end of the line, to be ignored at compilation
[0–9] any of the digits from 0 to 9
[A-Z] any of the upper-case letters from A to Z
[a-z] any of the lower-case letters from a to z The following are the basic data types: number, atom, boolean, string, and word-list-name.

integer==>[0–9]+ a sequence of numeric characters
number==>integer ('.' integer)

An atom is a sequence of any alphanumeric characters, hyphens, slashes, underscores, question marks, and exclamation marks. No more than one hyphen or slash in a row is allowed, and an atom cannot end with a hyphen or a slash. The atom must begin with an alphabetic character, an underscore, a question mark, or an exclamation mark.

letter==>{[A-Z]|[a-z]|'_'|'?'|'!'}
digit==>[0–9]
separator==>{'-'|'/'}
atom==>letter {letter |digit}*{separator{letter|digit}+}*

Case in atoms in the grammar specifications is never significant. So SYMBOL, Symbol and symbol are the same. (It would be disastrous to make a distinction between NG and Ng.) However, it is good practice to be consistent.

boolean==>{'T'|'F'|'NIL'} a special subtype of atom

A string is a sequence of any characters (using \"for") between double quotes, e.g. "abc def.3\"&"

string==>""charseq""
charseq==>{[A-Z]|[a-z]|[0–9]
|'!'|'@'|'#'|'$'|'%'|'^'|'&'|'*'|'('|')'|'_'|'-'|'+'|'='
'|~'|'{'|'}'|'['|']'|':'|';'|'\"'|'<'|'>'|',', '.'|'?'|'/'|' '}*

In addition, a charseq can include a single quote or apostrophe '

The convention in the five principal grammars will be that a lower case letter in a string in a rule will match with the same letter in the text in upper or lower or unknown case. Thus, "apple" in a rule will match with "Apple" in the text. However, an upper case letter in a rule will only match with an upper or unknown case in the text. Thus, "Apple" in a rule will not match with "apple" in the text.

Note that strictly speaking a specification "apple"[case=~lower] is inconsistent. We assume the way the system will interpret it is that the string "apple" in the rule will match the string "apple" in the text, but that then the check of features will rule out the match.

A word-list-name is an atom surrounded by dollar signs. It is used below to point to lists of words.

word-list-name==>'$' atom '$'

Whitespace characters in the following rules are ignored unless they are enclosed in double quotes. Different numbers and atoms must be separated by whitespace; thus, AB is the atom AB, not the two atoms A and B.

GRAMMAR DEFINITION

'END-OF-GRAMMAR' punctuates between GRAMMAR-PARTs
GRAMMAR==>GRAMMAR-PART {'END-OF-GRAMMAR' GRAMMAR-PART}*
GRAMMAR-PART ==>
'Name:' atom';'
('Input Type:' atom (attribute-type-decls)';')
('Output Type:' atom (attribute-type-decls)';')
('Root Category:' nonterminal-category-name {',' nonterminal-category-name}*';')
('Valref-functions:' function-name {',' function-name}*';')
{'Instantiate' (rule-specifiers) 'Rules' ('Except' rule-specifiers) 'By' bindings ';;'}*
'Rules:' RULE+('END-OF-RULES')

input type, output type, external attributes and root category can be given in any order rules can also be interspersed with declarations if followed by END-OF-RULES Name will be something like Preprocessor or Parser. It should be possible to specify the types of the values of the attributes. This is a provisional list of possible types. The types of input and output objects should normally be declared in the grammar part.

Attribute types can optionally be declared to enable run-time type checking of attribute values. The root category identifies the top level rules for this grammar part. The default root category is START.

(The Root Category declaration now allows multiple rule names)

(There is no longer any syntactic restriction on Root Category rules)

Valref-functions can also be declared. Valref-functions will be passed valref (value+reference information) arguments rather than just values.

Instantiation declarations support a mechanism in the grammar compiler to instantiate rules by sets of variable values. Any rule that contains one or more binding-vars will be instantiated in all possible consistent ways by the set of instantiations defined by 'Instantiate . . . Rules . . . By . . .' declarations.

attribute-type-decls==>'(' attribute-type-decl{',' attribute-type-decl}*')' attribute-type-decl==>attrib':' {attribute-type|attribute-type 'LIST' attribute-type 'FUNCTION'} attribute-type==>atom including ATOM, STRING, INTEGER, NUMBER, BOOLEAN, LIST, ALIST rule-specifiers==>rule-specifier{',' rule-specifier}* rule-specifier==>{rule-identifier|nonterminal-category-name} bindings==>binding {'&&' binding}* binding==>binding-var '=' binding-value binding-var==>atom an atom whose first two characters are '??' binding-value==>everything up to the next '&&' or ';;' (not allowed to contain binding-vars)

RULE DEFINITION

RULE==>LHS '→' RHS ';' SEM ';'

It is good practice to leave a space between LHS and →.
Rules should not be recursive. There should be no cycles. If there are the grammar is no longer necessarily finite-state, and such rules may not be supported by the implementation.

SYNTAX SPECIFICATION LANGUAGE

Grammar Start State

In any particular phase processing, there is a sequence of input objects, and a sequence of output objects is constructed out of them.

We assume a set of predefined attributes on the input and output objects, namely, cat, string, start, end. cat is the category of the object. string is the text string that the rule matches. start and end are pointers into the test to the places where the string starts and ends. string, start, and end are set automatically and do not need to be explicitly specified.

Priorities: Higher numbers for higher priority, defaults to 0

LHS==>(rule-identifier ':') nonterminal-category-name ('['('-') priority']')

rule-identifier==>atom nonterminal-category-name====>atom priority==>integer specify '-' priority for negative priority Rules can optionally have a rule-identifier that can be used to identify the rule for tracing.

If two or more rules have the same rule-identifier, only the last such rule is used. This allows the grammar to be modified by adding the changed rules at the end. It is also possible to effectively delete a rule by using <<fail>> as its RHS.

An example of the use of PRIORITY.

ADJ[1]→"state" "-" "owned"; state=t;

ADJ→N "-" V-En[trans];;

For the phrase "state-owned", the first rule applies, not the second.

RHS

RHS==>('#' LOOKBACK-TERM {'|' LOOKBACK-TERM}*'#') TERM+ ('#' LOOKAHEAD-TERM {'I' LOOKAHEAD-TERM}*'#')

LOOKBACK-TERM==>TERM1

LOOKBACK-TERM==>'START_OF_INPUT'

LOOKAHEAD-TERM==>TERM1

LOOKAHEAD-TERM==>'END OF INPUT'

The hash marks specify that TERM1 is to be matched but not consumed. This gives us one-symbol look-ahead or look-back. Its use is discouraged. If START_OF_INPUT END_OF_INPUT is specified, then there must be no more symbols in the input.

TERM==>TERM'*' zero or more occurrences

TERM==>TERM'+' one or more occurrences

TERM==>'{'TERM+{'|'TERM+}*'}' grouping with possible alternatives

TERM==>'('TERM+{'|'TERM+}*')' optional grouping with possible alternatives

TERM==>'<'TERM TERM+'>' optional sequence macro

The expression <TERM1 . . . TERMn> is equivalent to {TERM1 (TERM2) . . . (TERMn)|TERM2 (TERM 3) . . . (TERMn)| . . . |TERMn}

TERM==>TERM':' label a label must be an integer (This is a new restriction)

label==>integer>0

Labels are used by semantics to refer to input objects when the reference to them by category would be ambiguous. They are also used to refer to nonatomic terms, such as alternations. When a label is applied to an alternation, the label refers to the LAST constituent of the selected disjunct. E.g., in {A|B C}:1, the label 1 refers to either A or C, depending on which alternative was matched with the text.

Labels should be used only with terminal symbols or disjunctions of terminal symbols. If not, they will default to the most recent input object matched.

Labels cannot appear inside iterations* or+.

TERM==>TERM1

TERM1==>CAT ('[' ATTRS']')

CAT==>{string|word-list-name|terminal-category-name} terminal-category-name==>{atom|'Any'}

A special atom Any matches any category

TERM==>nonterminal-category-name ('[' ATTRS']')

allowing ATTRS to be specified for nonterminal categories is new the attribute restrictions are applied to the last input object matched by the rule; fails if no input objects were matched

TERM==>'<<'SET-ATTR'>>'

TERM==>FUNCTION-CALL

As an escape hatch when the semantics of this language proves too restrictive, calls to arbitrary functions can be made at any point in the rule. The conventions for function calls are described below. Similarly, the attribute setting functions described below can be explicitly placed in the rule and will be applied when that point is reached in the rule.

ATTRS

ATTRS==>ATTR1{','ATTR1}*{'|'ATTR1{',' 'ATTR1}*}* an ATTRS in its most general form is a disjunction of conjunctions of ATTR1s

ATTR1==>attr implicit value T

ATTR1==>'~'attr negation

ATTR1==>'('ATTRS')' parenthesization allowed attr==>{feature-name|string word-list-name} feature-name==>atom

Top-level conjunction and disjunction of attributes are allowed, but no nested conjunction or disjunction.

Constraints on transitions

ATTR1==>attrib{'<'|'>'|'<='|'>='}number

ATTR1==>attrib{'=='|'='|'!='|'=~'}VAL1 with a specific value

Two varieties of equals and not-equals are provided because tastes differ. There is no ambiguity between = used in conditions and=used in assignments, since conditions occur only in the syntax and assignments only in semantics. The symbol =~ is provided because it is very natural to say things like Word[case=~lower]

value types for attributes may be declared at the top level

VAL1==>{atom|string|number|boolean}

We may later want to introduce another kind of value, the entity:

VAL1==>entity

The entity data structure is notated as, e.g., '^PERSON', '^COMPANY', etc.

entity==>'^'atom

SEMANTICS SPECIFICATION LANGUAGE

SEM==>{{SET-ATTR|FUNCTION-CALL}';'}*

SEM can be empty, RULE ends with ';;'

SET-ATTR==>attrib'=' VAL attrib==>{attribute-name|attribute-name'.' field-name} attribute-name==>atom field-name==>atom

This expression causes the value of the attribute attrib of the output object to be set to VAL.

VAL==>{VAL1|VAL2}

VAL1 is given above. These are the possible constant values.

VAL2 allows us to set the value of an attribute of the output object to information derived from input objects and their attributes. There are various ways to refer to the input object corresponding to a particular constituent in RHS: the category alone, the label alone, and the category and label together. Whatever is used must refer UNAMBIGUOUSLY to some object in the RHS.

VAL2==>'(' attrib label')'

VAL2==>'(' attrib 'OUTPUT'')'

VAL2==>'(' attrib 'OUTPUT'label')'

VAL2==>'(' attrib 'OUTPUT'0')'

There is a special attrib OBJ that refers to the input object corresponding to that constituent in the RHS. Thus, in A→B:1 C; attr1=1; attr2=(OBJ 1); attr3=C; attr4=(OBJ C);;

attr1 is set to the integer 1, attr2 is set to the input object matching B in the rule, attr3 is set to the atom C, and attr4 is set to the input object matching C in the rule.

'OUTPUT' is taken to be a reference to the output object being constructed. This was previously, less mnemonically specified by 'START'. (ATTR OUTPUT 2) can be used to refer to the value of the ATTR attribute of the output object at label 2, i.e., the attribute value of an earlier version of the current output object.

When a category is referenced that does not exist, e.g., an alternative not taken or an optional element not present, the neutral value for the type of output object attribute is returned, e.g, the empty string "" for strings, 0 for numbers, NIL for booleans, atoms and lists.

Very often it is desired to combine the information from successive input objects. This is done with an operator COMBINE. NOTE: So far, COMBINE has not been used extensively in grammars. The interpretation of COMBINE depends upon its arguments.

VAL2==>'(' 'COMBINE'VAL+')'

If VAL is a number, COMBINE means ADD

If VAL is a string, COMBINE means CONCATENATE

If VAL is a boolean, COMBINE means OR

If VAL is an atom or list, COMBINE means APPEND

The last of these means that (COMBINE (A) B (C D)) is (A B C D). CONCATENATE is assumed to be smart about blanks and hyphens. The VALs should all be of the same type, but if an attempt is made to COMBINE a number and a string, the number is coerced into the corresponding string. Otherwise if two incompatible types are combined, a list of them is formed.

If one desires a list of numbers, strings, and/or booleans, LIST should be used. For atoms and lists, LIST and COMBINE are the same.

VAL 2==>'(' 'LIST'VAL+')'

The meaning of COMBINE and LIST for complex expressions can be defined recursively, as follows:

(COMBINE VAL1)=VAL1

(COMBINE VAL1$a$ VAL1$b$)=(ADD/CONCATENATE/OR/APEND VAL1$a$ VAL1$b$)

If the sequence A B occurs in RHS, then (COMBINE A B)=(COMBINE (COMBINE A) (COMBINE B))

If the labeled alternation {A|B}:1 occurs in RHS, then (COMBINE 1)=(COMBINE A) or (COMBINE B), whichever alternative was chosen If the iteration A* occurs in RHS and is matched by the sequence A1 A2 . . . , then (COMBINE A)=(COMBINE (COMBINE A1) (COMBINE A2) . . . )

For alternation with '|' when explicit reference to constituents is needed:

VAL 2==>'(' 'SELECT'label VAL+')'

The alternation in RHS must be labeled with label and there must be as many VALs as there are alternatives. The VAL is chosen corresponding to the alternative matched in RHS. Use of SELECT can generally be eliminated by splitting rules.

Finally, as an escape hatch, it is possible to call an arbitrary function.

VAL2==>FUNCTION-CALL

FUNCTION-CALL==>'<<'function-name argument*'>>' function-name==>atom argument==>VAL VAL above argument==>keyword keyword==>':' atom Functions are required to be free of side-effects, i.e., they are not allowed to modify their arguments, the current output object, etc. They should only be used to compute values used in assignment operations or as predicates to accept or reject parses. The only allowable structure-modifying operation is the use of the=assignment operation (described by SET-ATTR) for assigning a value to an attribute of the current output object.

The atom OUTPUT as argument of an attribute refers to the output object being built. Thus, (STRING OUTPUT) refers to the string attribute of the output object; (OBJ OUTPUT) refers to the whole output object; OUTPUT is just the atom OUTPUT. If the atom__FAIL__is returned by the function, the rule fails.

The functions PROCEED-WHEN, PROCEED-UNLESS, FAIL-WHEN, and FAIL-UNLESS can be used to convert the true/false (i.e., non-NIL/NIL) values of ordinary predicates to success/failure. For example, <<PROCEED-WHEN<<EQUAL X Y>>>>succeeds if (EQUAL X Y), fails otherwise;

<<PROCEED-UNLESS <<EQUAL X Y>>>>succeeds if (NOT (EQUAL X Y)), fails otherwise;

<<FAIL-WHEN<<EQUAL X Y>>>>fails if (EQUAL X Y), succeeds otherwise;

<<FAIL-UNLESS<<EQUAL X Y>>>>fails if (NOT (EQUAL X Y)), succeeds otherwise.

Proceed-WHEN and PROCEED-UNLESS were formerly named

SUCCEED-WHEN and SUCCEED-UNLESS

What is claimed is:

1. A system for providing information in response to a natural language query, comprising:
    an information extraction engine adapted to index an updated text source based on a predefined grammar, wherein said predefined grammar is based on one or more topics and objects;
    a database coupled to the information extraction engine to store the index output; and
    a natural language query engine coupled to the database to search the index for the text corpus in response to the natural language query.

2. The system of claim 1, further comprising a data acquisition unit coupled to the information extraction engine to automatically update the text corpus.

3. The system of claim 2, wherein the data acquisition unit receives data from a web crawler, a news service, or a search engine.

4. The system of claim 1, wherein the grammar is associated with a topic.

5. The system of claim 1, wherein the grammar is based on events and relationships associated with a topic.

6. The system of claim 1, wherein the grammar comprises pattern-action rules.

7. The system of claim 1, wherein the grammar comprises one or more rules to specify a proper noun, a complex word, a phrase, or a domain event.

8. The system of claim 1, wherein the grammar comprises one or more rules for merging partial information from different parts of a document.

9. The system of claim 1, further comprising searching the index for the text corpus using natural language querying.

10. The system of claim 9, wherein the natural language querying is based on a query grammar.

11. The system of claim 10, wherein the query grammar is associated with a topic.

12. The system of claim 10, wherein the query grammar is represented as pattern-action rules.

13. The system of claim 1, further comprising a query reply generator coupled to the natural language query engine to format the output of the search.

14. The system of claim 13, wherein the query reply generator creates a summary of the output for a group of documents.

15. The system of claim 13, wherein the query reply generator quotes a relevant portion of each located document in a summary.

16. The system of claim 13, wherein the query reply generator annotates the output by group in a summary.

17. The system of claim 13, wherein the query reply generator highlights a relevant portion in each located document.

18. The system of claim 1, further comprising a network coupled to the natural language query system.

19. The system of claim 18, wherein the network comprises the Internet.

20. The system of claim 18, further comprising one or more clients coupled to the natural language query engine.

21. The system of claim 20, wherein each client is a mobile computer.

22. The system of claim 20, wherein the client is a handheld computer adapted to transmit a natural language query to the natural language query engine and to receive a distilled natural language response from the natural language query engine.

23. The system of claim 20, wherein the client has a speech recognition engine adapted to convert user speech to the natural language query.

24. The system of claim 20, wherein the client has a text-to-speech engine adapted to convert the result of the search to speech.

25. The system of claim 1, wherein the text corpus is generated through computer recognition of spoken language.

26. The system of claim 1, further comprising:
    a multimedia data source having a sound stream and a corresponding video stream; and,
    a speech recognizer coupled to the multimedia data source and the data acquisition unit, the speech recognizer converting the sound stream to a text stream and delivering the text stream to the data acquisition unit.

27. The system of claim 26, wherein the multimedia data source comprises one of a digital video disk, a videotape, a television transmission source, and a cable transmission source.

28. The system of claim 21, wherein the client has a pen input engine adapted to convert user handwritings to the natural language query.

29. A natural language information querying system, comprising:
    an indexing facility configured to automatically generate indices of updated versions of the textual information based on a predefined grammar, wherein said predefined grammar is based on one or more topics and objects; and
    a database coupled to the indexing facility to store the indices.

30. The system of claim 29, further comprising a query engine coupled to the database to respond to the natural language query.

31. A method for providing information in response to a natural language query, comprising:

extracting information from an updated text source based on a predefined grammar, wherein said predefined grammar is based on one or more topics and objects; and creating a stored indexed text corpus adapted to permit natural language querying.

32. The method of claim 31, further comprising searching the stored indexed text corpus based on the natural language query.

33. The method of claim 31, wherein the information extracting step further comprises creating templates conforming to one or more events and relationships associated with a topic.

34. The method of claim 31, further comprising updating the text corpus by applying a speech recognizer to a multimedia stream.

35. The method of claim 31, further comprising creating a summary for each group of documents.

36. The method of claim 31, further comprising quoting a relevant portion of each located document in a summary.

37. The method of claim 31, further comprising annotating the output by group in a summary.

38. The method of claim 31, wherein the stored indexed text corpus resides on a server, further comprising:

sending the natural language query from a handheld computer; and receiving a natural language response from the server and forwarding the response to a user.

39. The method of claim 31, further comprising converting the response to speech using a text-to-speech unit.

40. The method of claim 31, further comprising receiving the natural language query using a speech recognizer.

41. The method of claim 31, further comprising receiving the natural language query using a handwriting recognizer.

42. The method of claim 31, wherein the query and the text corpus relate to locating competitive intelligence information.

43. The method of claim 31, wherein the query and the text corpus relate to locating litigation support information.

44. The method of claim 31, wherein the query and the text corpus relate to locating products on-line.

45. The method of claim 31, wherein the query and the text corpus relate to locating medical information.

46. The method of claim 31, wherein the query and the text corpus relate to locating legal information.

47. The method of claim 31, wherein the query and the text corpus relate to locating electronic commerce information.

48. The method of claim 31, wherein the query and the text corpus relate to locating educational information.

49. The method of claim 31, wherein the query and the text corpus relate to locating financial information.

50. The method of claim 31, wherein the query and the text corpus relate to locating investment information.

51. The method of claim 31, wherein the query and the text corpus relate to locating information for a vertical market application.

* * * * *